May 12, 1959
J. R. DONNAY
2,885,937
TELEVISION CAMERAS
Filed May 10, 1954
3 Sheets-Sheet 1
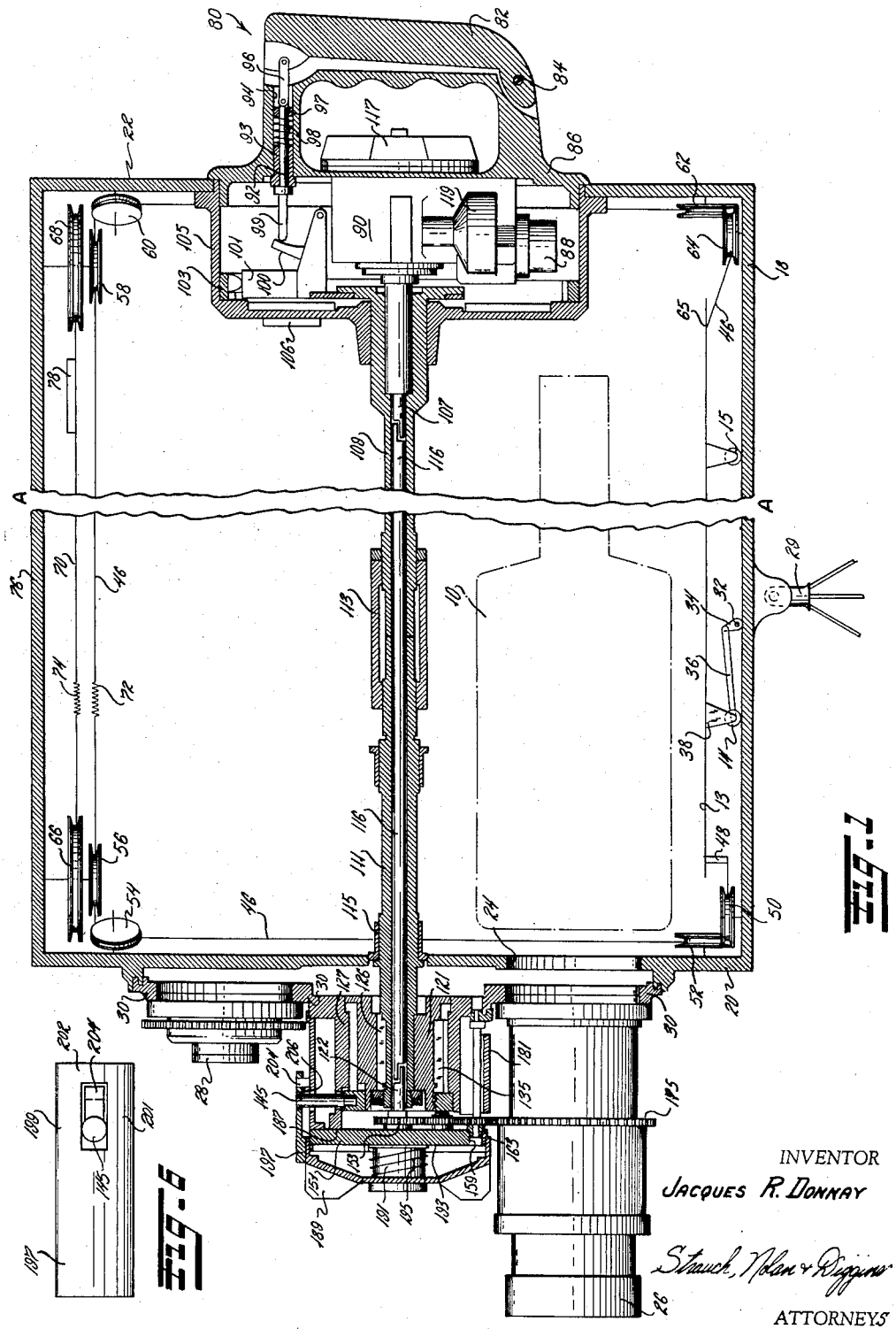
INVENTOR
JACQUES R. DONNAY
ATTORNEYS May 12, 1959
J. R. DONNAY
2,885,937
TELEVISION CAMERAS
Filed May 10, 1954
3 Sheets-Sheet 2
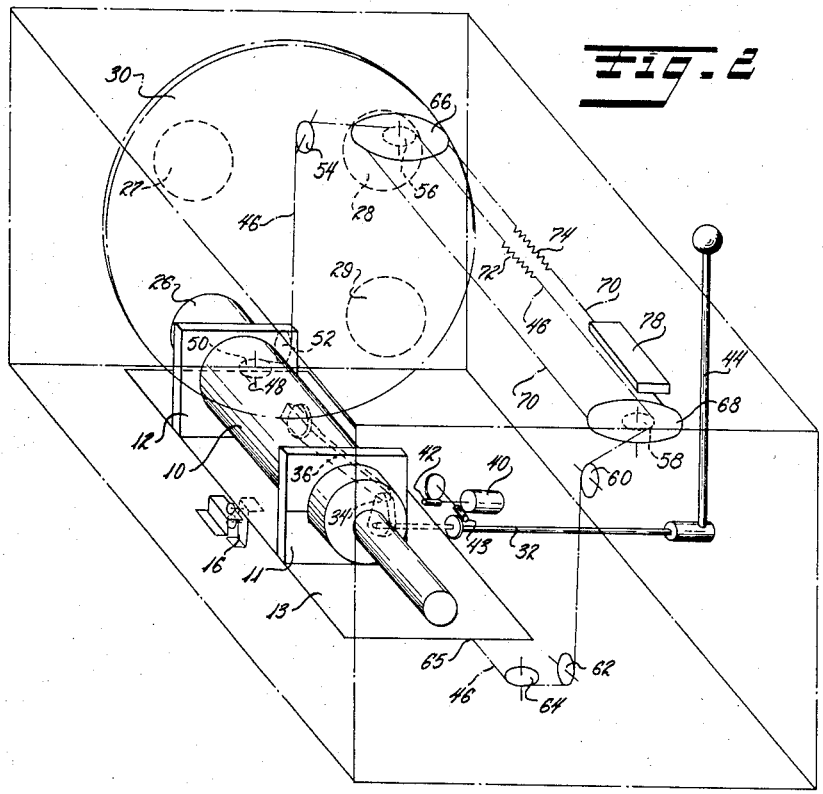
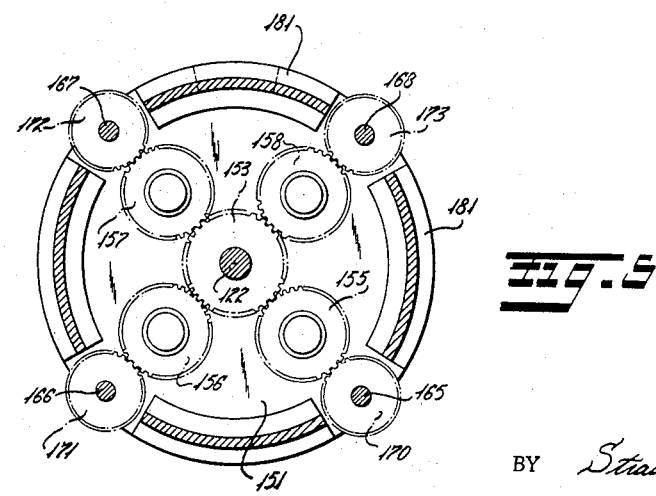
INVENTOR
JACQUES R. DONNAY
BY *Strauch, Nolan & Diggins*
ATTORNEYS May 12, 1959
J. R. DONNAY
2,885,937
TELEVISION CAMERAS
Filed May 10, 1954
3 Sheets-Sheet 3
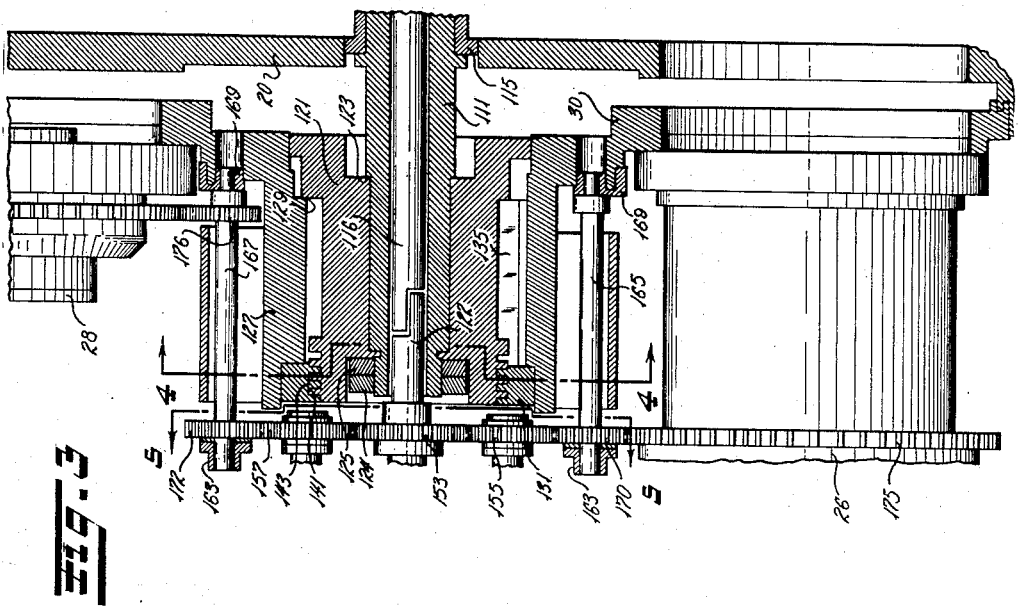
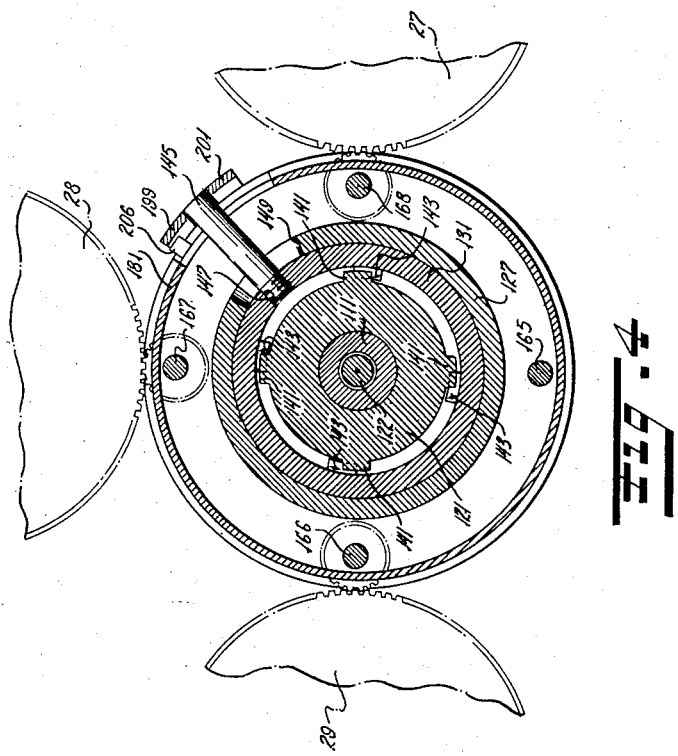
INVENTOR
JACQUES R. DONNAY
BY Strauch, Nolan & Riggins
ATTORNEYS

United States Patent Office 2,885,937
Patented May 12, 1959

2,885,937

TELEVISION CAMERAS

Jacques René Donnay, Paris, France, assignor to Ste Nouvelle de l'Outillage R.B.V. et de La Radio-Industrie, Paris, France, a society of France Application May 10, 1954, Serial No. 428,617

Claims priority, application France May 27, 1953

6 Claims. (Cl. 95—45)

This invention relates to improvements in turret type cameras and more particularly to lens selector mechanisms and related apparatus for providing focusing and lens diaphragm adjustments.

Television and motion picture cameras are commonly equipped with a turret having several lenses of varying focal lengths to provide means for obtaining images on the face of the light sensitive surface and covering a wide range of distances. The optimum distance between the light sensitive surface and the lens varies with the different lenses used and with the distance from the lens to the center of interest of the scene being recorded. Focal length adjustments are required from time to time as the scene changes and in the past have been made by moving either the lens turret or the television tube with respect to the camera housing. This invention relates in part to an improved mechanism for moving the television tube.

The television tube and its operating coils are commonly mounted on a movable carriage which is either manually or automatically controlled. Since the weight of the tube assembly is approximately 20 pounds and the camera is frequently pointed at objects which are at elevations different from the elevation of the camera, the force required to focus the camera varies with the angle of inclination of the camera. It is a major object of this invention to provide a dynamically balanced picture tube assembly that requires an amount of focusing force small with respect to the weight of the tube assembly regardless of the angle of inclination of the camera.

By dynamically balancing the pick-up tube carriage, a lighter electric motor, which requires less space, may be used to permit remote control focusing. This lighter motor tends to balance out the additional weight added to provide the balancing force and provides a smaller force requirement in the event of manual focusing by the operator.

It is, therefore, a further and more specific object of this invention to provide a dynamically balanced picture tube assembly with a minimum increase in the total weight of the camera.

In the prior art turret type cameras it has also been necessary to correct the lens diaphragm setting when a lens is newly moved into operative position because the diaphragm adjustment has been effective only on the lens in use. The present invention further incorporates a suitable mechanism so that as the turret is rotated to shift from the use of one lens to another, the diaphragm setting of the new lens will be the same as, or proportional to, the diaphragm setting of the previously used lens. This feature prevents the tube from transmitting a picture having a light intensity so bad that a monitor in a remote position has difficulty in ascertaining the proper adjustment to obtain quick recovery of a good picture.

It is therefore another object of this invention to provide a simultaneous diaphragm adjustment of all the lenses in a turret camera.

It is a further object of this invention to provide an extremely quiet controlling device for the lens diaphragm adjustment to reduce mechanical noises which may be picked up by any microphone placed close to the camera.

It is a still further object of this invention to provide a novel turret positioning control and lens aperture control by means of coaxial shafts actuated by compact controls at the rear panel of the camera.

Another object of the invention is to provide mechanical controls for adjusting the turret position and the lens diaphragm opening that are easily assembled and removed.

Further objects of the invention will become more fully apparent by reference to the claims and the description as it progresses in connection with the drawing wherein:

Figure 1 is a side view in section of a television camera illustrating the present invention;

Figure 2 is a schematic pictorial view showing the mechanism;

Figure 3 is an enlarged fragmentary elevational view partially in section of the turret assembly showing the gearing for controlling the lens apertures;

Figure 4 is an end view in section along lines 4—4 looking towards the camera housing of Figure 1 of a sub-assembly on the end of the turret;

Figure 5 is an end view in section of a sub-assembly along line 5—5 of Figure 3; and Figure 6 is a partial top view of Figure 1 showing the turret locking mechanism.

Referring to Figures 1 and 2, the television pick-up tube and scanning assembly 10 is mounted by conventional clamps 11 and 12 on a carriage 13 supported by rollers 14, 15 and 16 for permitting focusing movement of the carriage parallel to the axis of the camera housing 18. The housing 18 is ordinarily placed on a standard tripod 29 which permits tilting up to angles as great as 60°. The illustration in Figure 1 of the housing 18 and the parts extending substantially from the front panel 20 to the rear panel 22 is foreshortened by a break line A—A. The pick-up tube assembly 10 is centrally located with respect to bore 24 in the front panel 20 and four lenses, 26, 27, 28 and 29 are mounted on a lens mounting plate 30 which is rotatably mounted on the front panel 20 by means subsequently described to permit various ones of the lenses to be optionally moved into operative position.

The focusing mechanism is schematically illustrated by Figures 1 and 2 wherein the pick-up tube carriage 13 is moved by rotation of shaft 32 through lever 34 and rod 36 assembly which may be connected to carriage 13 as at roller support 38. For remote control of the focusing, shaft 32 is driven by a motor 40 through a suitable gear reduction means such as tangential screws 42 and 43. The lead angle of the threads on screws 42 and 43 is preferably chosen so that focusing can also be effected by means of handle 44 by the camera operator when desired.

Cable 46 is connected at one end 48 of the carriage 13, around pulley 50 having a vertical axis, pulleys 52 and 54 having horizontal axes, pulleys 56 and 58 having vertical axes, pulleys 60 and 62 having horizontal axes, pulley 64 having a vertical axis and is connected at the other end 65 of carriage 13. Connected rigidly with pulleys 56 and 58 are large pulleys 66 and 68 around which a separate endless cable 70 is wound. Both cable 46 and cable 70 are held under tension as by springs 72 and 74 respectively, and turn together, though at different speeds, as the carriage 13 is moved.

The axes of each of the pulleys are mounted in suitable journals, not shown, adjacent front panel 20, top panel 76 and rear panel 22, depending on the location of the pulley. Since the diameters of pulleys 66 and 68 are considerably larger than the other pulleys, the common axis for pulleys 56 and 66 and pulleys 58 and 68 are set in a distance further from the edge of the top panel 76 of the housing than is used with the other pulleys. The axes of pulleys 54 and 60 are therefore oriented as clearly shown in Figure 1 at an angle with respect to the axis of housing 18 so that the cable is properly directed to the small pulleys 56 and 58 on the top panel 76 of the housing.

A mass 78 is attached to the part of cable 70 which moves in a direction opposite to the displacement of carriage 13. If the product of the weight and displacement of mass 78 is made substantially equal to the product of the weight and displacement of carriage 13, substantially opposite works are required to move the carriage 13 and mass 78, regardless of the angle of the camera with respect to the horizontal plane, the operating work being equal to the difference of said products. Since the weight of the carriage and the pick-up tube with its fixtures is about twenty pounds and the addition of this much weight to a television camera is objectionable for portability considerations, a lighter mass 78 can be used if its displacement is proportionately increased. Mathematically the relation can be expressed as $$\frac{P}{M} = \frac{R}{r}$$

where P is the weight of the carriage 13 and pick-up tube assembly, M is the weight of mass 78, $r$ is the radius of pulley 56 or 58 and R is the radius of pulley 66 or 68.

By having a relatively large difference in pulley radii the weight of mass 78 may be made only a few pounds. Since the force required to focus the camera remains very small regardless of the tilt angle of the camera with respect to the horizontal, an electric motor 40 of relatively small power and therefore small dimensions and weight can be used.

Referring again to Figure 1, the position of lens mounting plate 30 is controlled by handle 80 on rear panel 22. Handle 80 includes an arm 82 pivotable about pin 84 supported on a base 86 which is rotatably mounted on rear panel 22. Electric motor 88 and gear reduction housing 90 are secured to base 86 and turn with handle 80.

Finger 92 is slidably mounted in a sleeve 93 in bore 94 and connected to arm 82 by pin mounted linkage 96. Bushing 97 slides with finger 92 in bore 94 and expansion spring 98 biases arm 82 in its outward position. The nose portion 99 of finger 92 moves against a pressure lever 100, the end of which controls the radial movement of finger 101. Crown 103 secured to fixed casing 105 has slots or detents properly spaced around the periphery to provide positive positioning of the handle 80. An electrical terminal board 106 may be mounted on casing 105 to supply working voltages to the various electrical components in camera housing.

The handle 80 and its integral parts which include the base 86, finger 92, motor 88, gear reduction housing 90 and shaft 107 are held in position by a set screw (not shown) on hollow shaft 109. By removal of the set screw, these parts may be readily removed for inspection and maintenance.

Hollow shafts 109 and 111 are forced to turn together by sleeve 113 and all turn with handle 80. Shaft 111 is journaled in a bearing sleeve 115 in front panel 20 and extends into the turret assembly.

Inside hollow shaft 109 is a second shaft 116 which turns with shaft 107, gear reducing mechanism in housing 90 and motor 88. Shaft 107 may also be controlled by knob 117 on rear panel 22. A stop (not shown) limits the motion of knob 117 which may also turn with or drive the moving arm of a potentiometer 119 connected to a milliammeter directly calibrated to give a reading proportional to the diaphragm setting of the lenses. This meter, or at least the calibrated dial of the meter is placed on the rear panel 22 so that it can easily be seen by the operator.

Shaft 116 extends substantially throughout the camera housing and terminates inside hub 121 as is shown also in Figure 3. Flats are machined on the mating surfaces of both ends of shaft 116 so that this shaft will turn with shaft 107 and cause shaft 122 to turn.

Hub 121 is piloted on the outer end portion of hollow shaft 111 by surface 123 and is held in position by two lock nuts 124 and 125 threadedly secured to the outer most end of hollow shaft 111. A key 126 (Figure 1) is located between hub 121 and hollow shaft 111.

Lens mounting plate 30 has a boss 127 which is piloted on hub 121 by surface 129 and held in position by nut 131. Key 135 is located between lens mounting plate 30 and hub 121. Lens 26 is in the operative position and the other lenses, including 28, which are in inoperative positions, may be moved into the operative position by rotation of the lens mounting plate 30.

Referring to Figures 3 and 4, on the outer end of hub 121 are a series of projections 141 having slots therebetween to receive similar mating projections 143 on nut 131. Pin 145 is threaded at its inner end to extend into threaded hole 147 in nut 131 through a slot 149 in boss 127.

Gear mounting member 151 shown in Figures 1 and 5 fits on the outer end of the turret assembly and carries center gear 153 and four idler gears 155, 156, 157 and 158 evenly spaced around the periphery of gear 153. Four holes 159, only one of which is illustrated, are evenly spaced around the periphery of gear mounting member 151. In each of these holes a bushing 163 is mounted to journal four gear shafts 165, 166, 167 and 168. The other ends of the four gear shafts 165, 166, 167 and 168 are journaled in bushings 169 in lens mounting plate 30.

Gears 170, 171, 172 and 173 on gear shafts 165, 166, 167, 168 are driven by idler gears 155, 156, 157 and 158 respectively. Gear 170 mates with rotatable gear 175 (Figure 1) which in turn controls the rotation of the control ring of the usual iris or equivalent lens diaphragm of lens 26 in a conventional manner. Since the lens diaphragms on each of the other lenses are located in planes other than the plane of gears 170, 171, 172 and 173 an additional gear 176, 177 or 178 as illustrated in Figures 3 and 4 mounted on each of shafts 166, 167 and 168 is spaced along the axis of its respective gear shaft to be in the plane of the diaphragm control gear to simultaneously control the diaphragm setting of each of the other lenses.

A cylindrically shaped cover 181 extends around the periphery of gear mounting member 151 and has slots cut out through which the gears on shafts 165, 166, 167 and 168 extend and pilots gear mounting member 151 on surface 185 of lens mounting plate 30 and against surface 187 on boss 127. Wing nut 189 is rotatably and slidably mounted on shaft 191 extending from the outer surface 193 of gear mounting member 151 about which compressed spring 195 is mounted. On one side of wing nut 189 is an integral finger 197 which extends along cover 181 on one side. The finger 197 has a slot with sides 199 (Figure 6) and 201 to enclose opposite sides of pin 145 so that the pin can be forced to turn with wing nut 189. There is on the extremity of finger 197 an end 202 which causes an anchorage teat 204 carried by pin 145 to press upon stop 206 carried by cover 181 due to the expansion force of spring 195. By pressing on wing nut 189 in a direction against the bias of spring, the anchorage teat 204 is released from stop 206 so that rotation of wing nut 189 turns nut 131 concomitantly with pin 145 to release nut 131 and permit removal of the gear mounting member 151 and its associated parts, as well as the entire turret assembly itself.

In operation, the diaphragm opening setting of the lenses is controlled by either the camera operator by means of knob 117 or by the monitor by motor 88 through connecting mechanisms including shafts 107, 116, and 122, gears 153, 155, 170 and 195. The diaphragm of each lens is simultaneously adjusted so that as the turret is rotated and a new lens is moved into operating position, the diaphragm opening adjustment of the newly positioned lens will be substantially correct. A monitor from a remote position can readily make any fine adjustment in the diaphragm setting by means of the motor 88 controlling shaft 107.

The desired lens on the turret is moved into operating position by gripping handle 80, squeezing arm 82 and twisting. The hollow shafts 105 and 111 cause hub 121 and lens mounting plate 30 to rotate accordingly. The position of the pick-up tube 10 for proper focusing is then controlled either remotely by the monitor through electric motor 40 or at the camera by the operator with handle 44. The pick-up tube 10 and its associated parts are dynamically balanced for focusing movement by mass 78 and differential pulley and cable apparatus provide an improved television camera giving overall quicker recovery of a good television picture as the camera is changed from one scene to another and/or different lenses are moved into the operating position.

The invention may be embodied in other specific forms without departing from the spirit or essential characteristics thereof. The present embodiment is therefore to be considered in all respect as illustrative and not restrictive, the scope of the invention being indicated by the appended claims rather than the foregoing description and all changes which come within the meaning and range of equivalency of the claims are therefore intended to be embraced therein.

What is claimed and desired to be secured by United States Letters Patent is:

1. In a television camera having a housing, a front panel on said housing, a lens positioning plate mounted for pivotal movement on the outside of said housing and supporting a plurality of different focal length lenses, each lens having an associated adjustable diaphragm opening, a hub secured to said lens positioning plate, a first hollow shaft rotatably mounted on said housing and extending through the front panel to effect rotation of said hub and said lens positioning plate, a gear supporting member removably secured adjacent the end of said hub remote from said front panel to be axially displaced along said hollow shaft from said lens positioning plate, a first gear mounted for rotation about the axis of said hollow shaft and positioned between said one end of said hub and said gear supporting member, a second shaft mounted for independent movement inside said hollow shaft having one end connected to said first gear, and means driven by said first gear to adjust all lens diaphragm openings simultaneously.

2. The television camera as defined in claim 1 wherein said last mentioned means includes an idler gear journaled on said gear supporting member and driven by said first gear, and a gear and shaft assembly journaled at one end on said lens mounting plate and at the other end on said gear supporting member, said assembly being driven by said idler gear and driving a diaphragm control mechanism.

3. The television camera as defined in claim 1 wherein said last mentioned means includes a separate idler gear journaled on said gear supporting member for each of said plurality of diaphragm openings, part of said idler gears being in constant engagement with said first gear, and a separate gear and shaft assembly journaled at one end on said lens mounting plate and at the other end in said gear supporting member, each of said assemblies being driven by a different one of said idler gears for driving a separate diaphragm control mechanism for each of said diaphragm openings.

4. In a multi-lens turret for use with a camera having a centrally located shaft for optionally adjusting the position of said turret on the front panel of the camera housing: a hub adapted to be slidably received on said shaft and secured to turn with said shaft; a lens mounting plate sub-assembly slidably received on said hub and removably secured to said hub, said sub-assembly including a separate bushing located adjacent a plurality of said lenses; a gear supporting member removably secured to said sub-assembly adjacent the end of said hub remote from said front panel; a plurality of gear and shaft assemblies, one end of each of said shafts being mounted in said bushings and the other end of said shafts being journaled in said gear supporting member; a gear on each of said gear and shaft assemblies for controlling the aperture size of a different lens; and means for concomitantly driving each of said gear and shaft assemblies.

5. The turret defined in claim 4 wherein said last mentioned means comprises a plurality of idler gears each rotatably mounted on said gear supporting member and in constant mesh with said gear and shaft assemblies, and a sun gear in constant mesh with each of said idler gears, the rotational position of said sun gear being controllable for adjusting the diaphragms of all the lenses.

6. In a removable multi-lens turret assembly, a hub having a pilot surface on a first end and a plurality of circumferentially spaced radially projecting surfaces on the other end, a lens mounting plate supported on said pilot surface and having a boss extending over the projections on said hub, a nut having complementarily spaced radially projecting surfaces freely movable inside said boss for holding said lens mounting plate on said hub, a circumferentially directed slot in said boss, a pin extending through said slot and frictionally received by said nut whereby turning motion supplied to said pin causes engagement or disengagement of the projecting surfaces, an end cap removably secured to said turret assembly and positioned adjacent the other end of said hub, and a gear train supported by said end cap for controlling the lens diaphragm openings.

References Cited in the file of this patent

UNITED STATES PATENTS 2,572,729    Jackson et al. _____ Oct. 23, 1951

FOREIGN PATENTS 531,524    France _____ Oct. 26, 1921